July 12, 1932. F. Y. OMUREI 1,867,523
APPARATUS FOR PREPARING POWDERED FISH
Filed May 16, 1930 5 Sheets-Sheet 1

FRED Y. OMUREI INVENTOR

July 12, 1932. F. Y. OMUREI 1,867,523
APPARATUS FOR PREPARING POWDERED FISH
Filed May 16, 1930 5 Sheets-Sheet 3

FRED Y. OMUREI INVENTOR

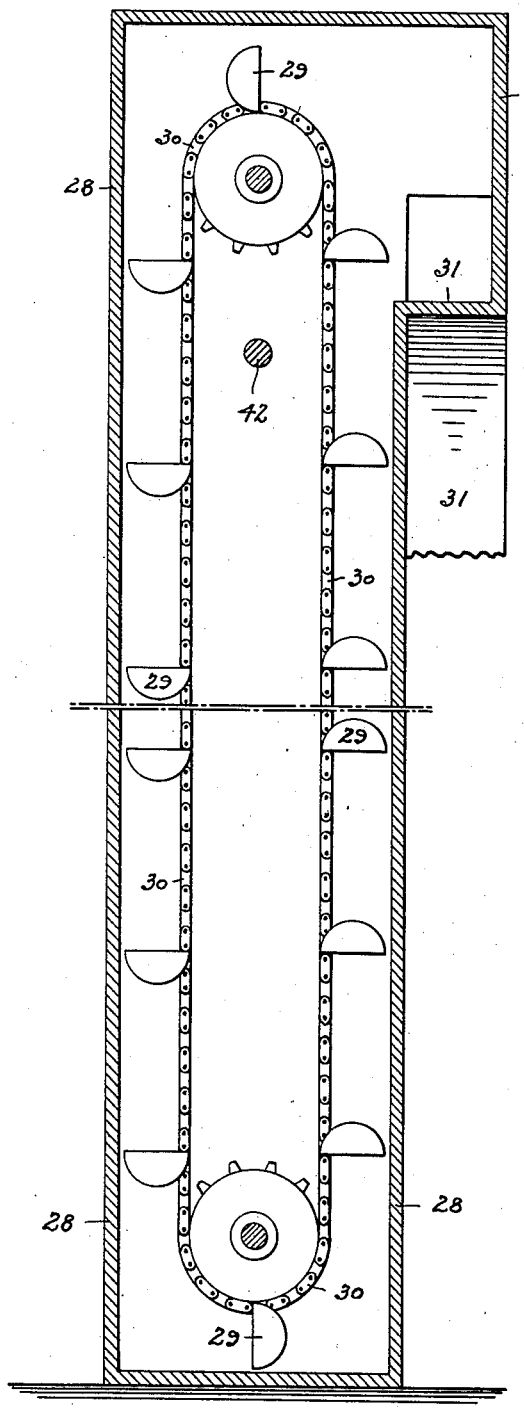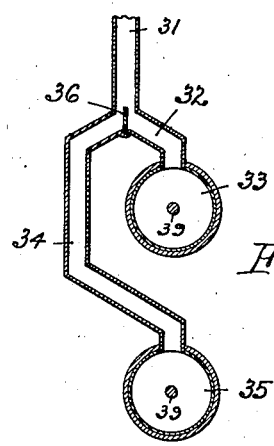

July 12, 1932.  F. Y. OMUREI  1,867,523
APPARATUS FOR PREPARING POWDERED FISH
Filed May 16, 1930   5 Sheets-Sheet 5

FRED Y. OMUREI
INVENTOR

WITNESS:

BY
ATTORNEY

Patented July 12, 1932

1,867,523

UNITED STATES PATENT OFFICE

FRED Y. OMUREI, OF HONOLULU, TERRITORY OF HAWAII

APPARATUS FOR PREPARING POWDERED FISH

Application filed May 16, 1930. Serial No. 453,016.

This invention relates to a method of and apparatus for producing fish powder, and to the article, the general object of the invention being to provide means for grinding the fish into a powder and drying the same by first passing the fish through the grinding means and then passing the ground fish through ovens, with means whereby the operation is a continuous one and is carried out in one apparatus.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 4 is a section on line 4—4 of Figure 1.

Figure 5 is a sectional detail view showing the chutes for leading the material from the elevator to the ovens.

Figure 15:
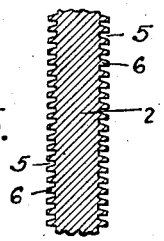
Figure 15 is a fragmentary sectional view through the grinding plate.

In these drawings, the letter A indicates the supporting frame of the apparatus, and the numeral 1 indicates a housing supported in a part of the frame, this housing being vertically arranged and being of gradually decreasing width from its top to its bottom. The top of the housing is open so that the material to be ground can be placed therein. A vertically arranged plate 2 is supported for horizontal movement by the guideways 3 in the top part of the housing at the center thereof and a roller 4 is arranged on each side of the lower part of the plate. The plate is formed with the horizontal and vertical grooves 5 which form the teeth or projections 6 in both faces of the plate, these projections being shaped as shown in Figure 15. An intermediate pair of rollers 7 is located under the rollers 4 and a lower pair of rollers 8 is located under the rollers 7. Each roller is provided with a jacket 9, the exterior surface of which is formed with the annular and longitudinal grooves 10 which form the teeth or projections 11. The teeth of the upper rollers 4 are larger in size than the teeth of the intermediate rollers 7 and the teeth of the intermediate rollers 7 are larger in size than the teeth of the lower rollers 8, as shown in Figures 6, 7, 8, 12, 13 and 14. The rollers of the pair 4 are spaced a greater distance from the plate 2 than the rollers 7 are spaced from each other and these rollers 7 are spaced a greater distance apart than are the rollers 8, as clearly shown in Figure 2.

Figure 2:
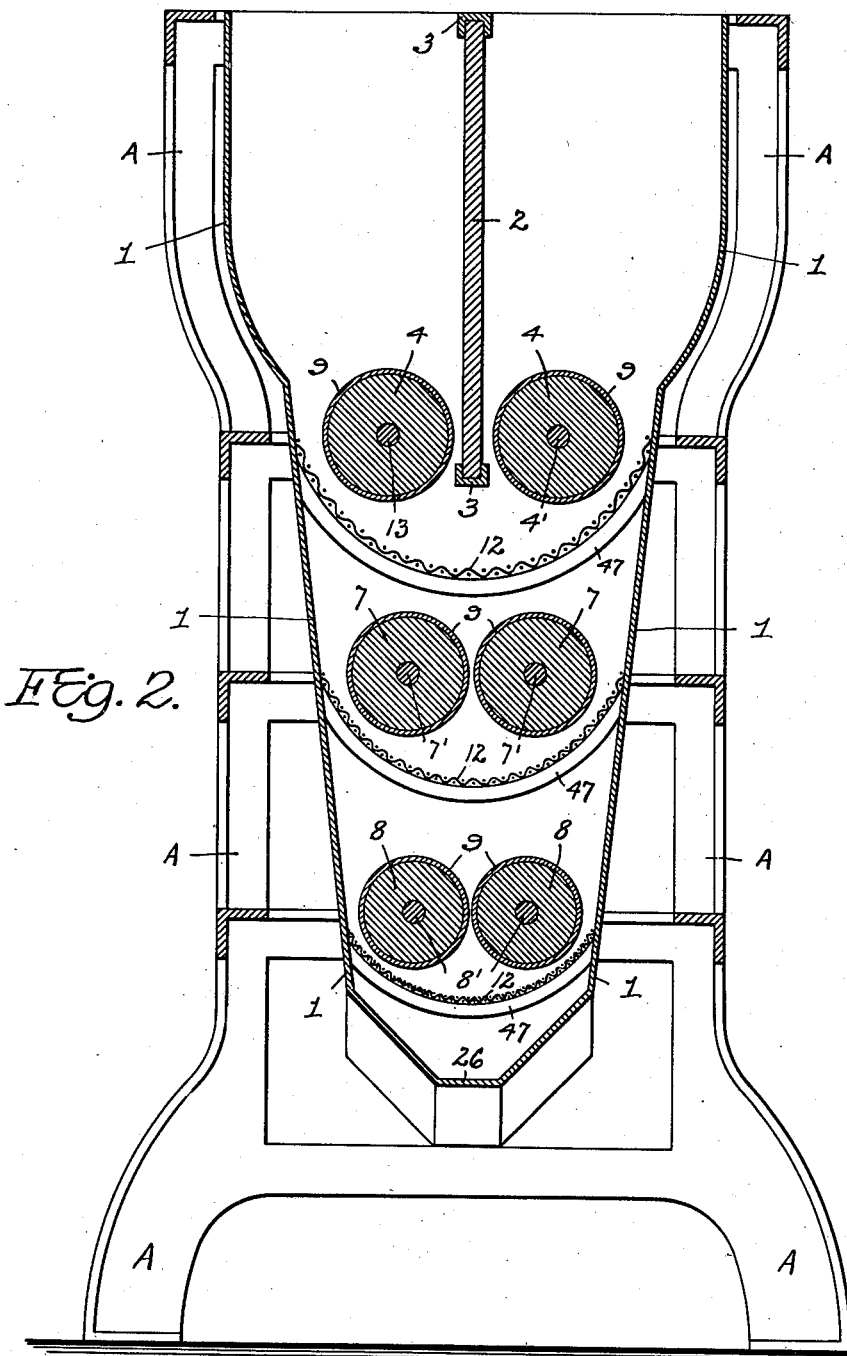
Figure 2 is a section on line 2—2 of Figure 1.
Figure 3:
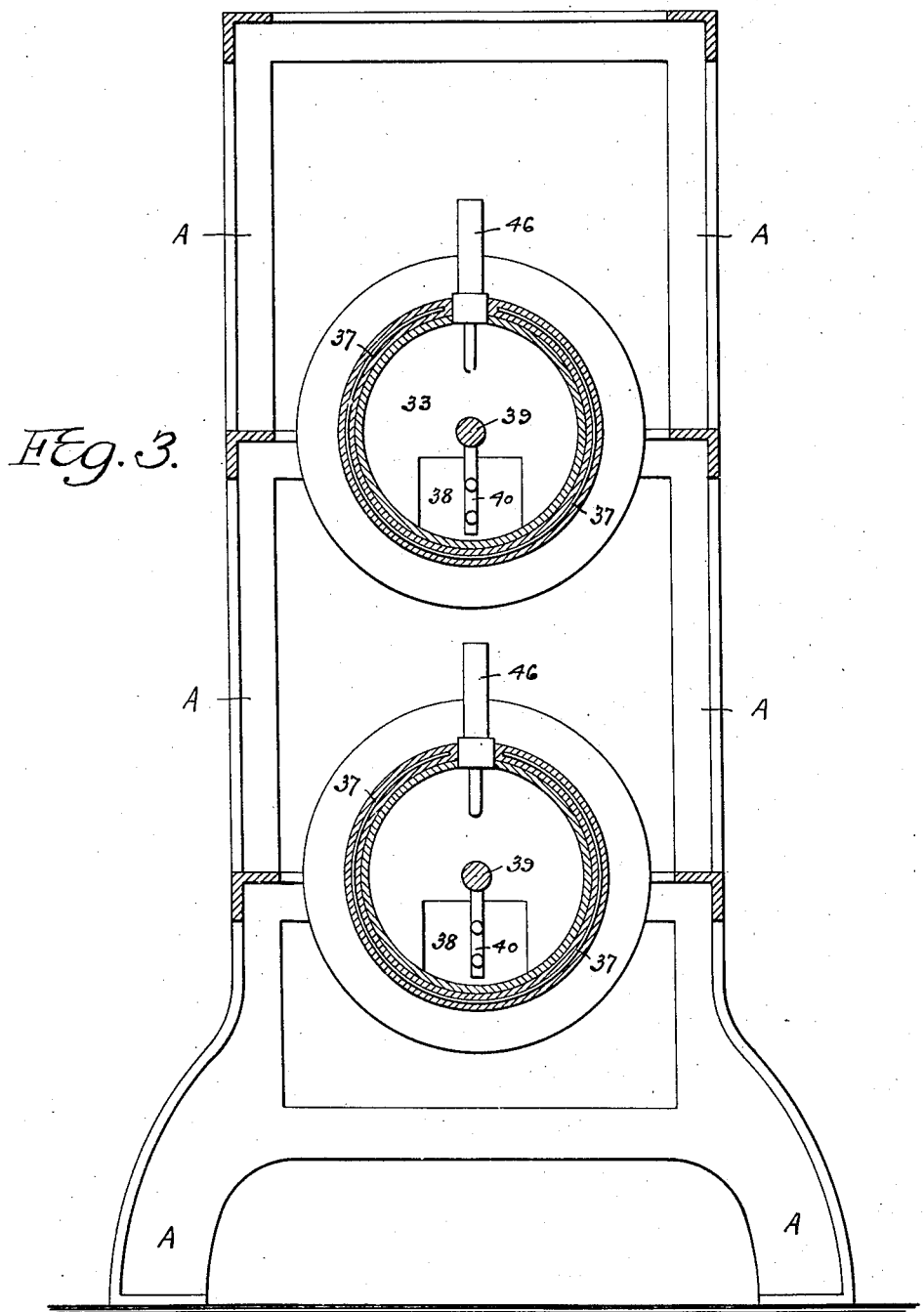
Figure 3 is a section on line 3—3 of Figure 1.
Figure 6:
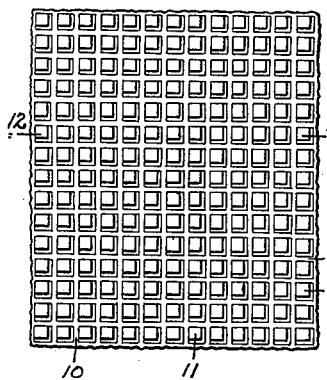
Figure 6 is a view showing the projections on a roller of the first set.
Figure 7:
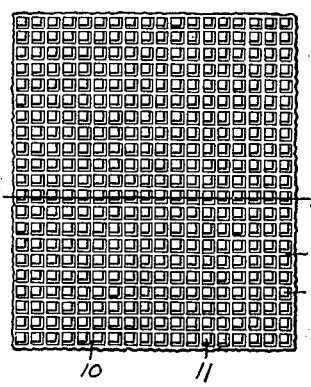
Figure 7 is a similar view showing the projections on a roller of the second set.
Figure 8:
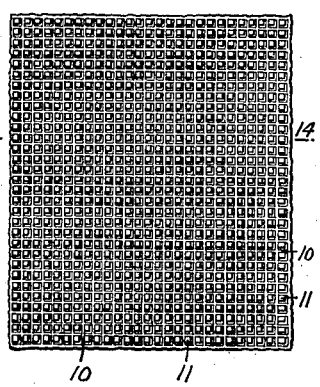
Figure 8 shows the projections on a roller of the third set.
Figure 9:
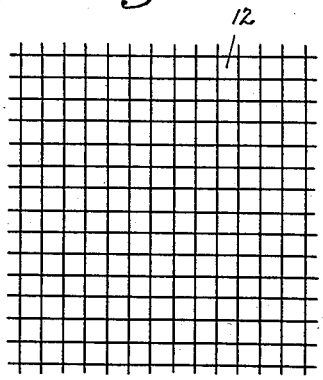
Figures 9, 10 and 11 are views showing the screens used with the three sets of rollers.
Figure 10:
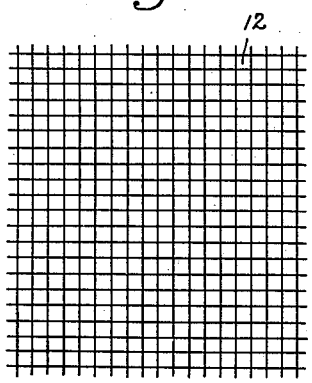
Figure 11:
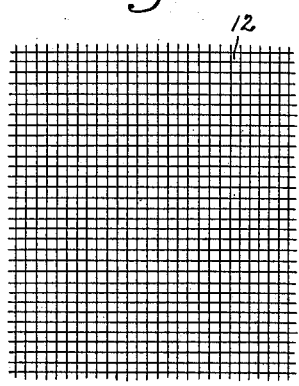
Figure 12:
Figure 12 is a section on line 12—12 of Figure 6.
Figure 13:
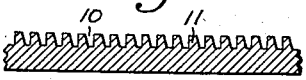
Figure 13 is a section on line 13—13 of Figure 7.
Figure 14:
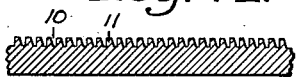
Figure 14 is a section on line 14—14 of Figure 8.

A screen 12 is located under each pair of rollers and extend transversely across the housing, each screen being of curved shape in cross section, as shown in Figure 2. The upper screen is of larger mesh than the intermediate screen and the intermediate screen is of larger mesh than the lower screen, as shown in Figures 2, 9, 10 and 11.

I prefer to provide a clearance of $\frac{1}{16}$ of an inch between the rollers 4 and the plate 2 and to make the top screen of $\frac{1}{16}$ inch mesh. I also prefer to make the clearance between the rollers 7 $\frac{1}{32}$ of an inch to make the intermediate screen of $\frac{1}{32}$ inch mesh. The rollers 8 have $\frac{1}{64}$ inch clearance and the bottom screen is of $\frac{1}{64}$ inch mesh.

A shaft 13 is horizontally arranged in the frame and one of the rollers 4 is fastened to the shaft, the shaft passing through the roller and this shaft is connected to a shaft 4' of the second roller 4 by the gears 14 so that the rollers rotate in reverse directions. The shaft 13 is connected by the chain and sprockets shown generally at 15, with a shaft 7' of one of the rollers 7 and this shaft 7' is connected with the shaft 7' of the other roller 7 by the gears 16. The first shaft 7' is connected by the chain and sprockets shown generally at 17 with a shaft 8' of one of the rollers 8 and the two shafts of these rollers 8 are connected together by the gears 18. Thus a roller of each pair is rotated in an opposite direction from the other roller of the pair so that material dropping between the rollers will be fed between the rollers and thus be ground by the teeth thereon.

A motor M is supported on a part of the frame and is belted to the shaft 13, as shown generally at 19.

The shaft 13 carries a worm 20 which meshes with a worm gear 21 supported on a stub shaft 22 journaled in the frame and a crank 23 on the gear 21 is connected by a pitman 24 with a stem 25 connected with the plate 2 so that the plate will be reciprocated horizontally from the motor, as said motor is driving the three sets of rollers.

Figure 1:
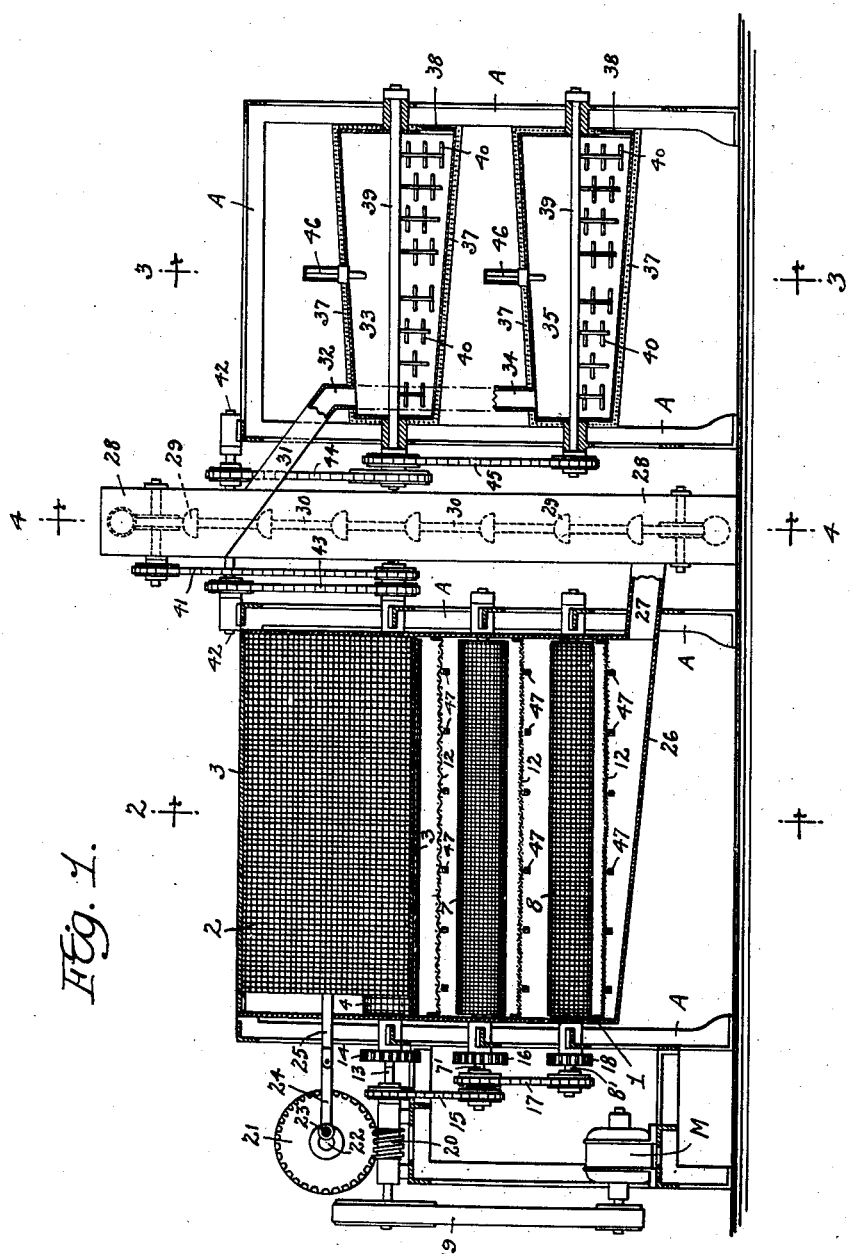
Figure 1 is a longitudinal sectional view through the apparatus.

From the foregoing it will be seen that the material placed in the top part of the housing is first acted on by the rollers 4 which grind the material between themselves and the reciprocating plate 2 and then this material will pass through the top screen and fall upon the rollers 7 and thus be acted on by the finer teeth of said rollers and after passing through these rollers 7, the material will pass through the intermediate screen which is of finer mesh than the top screen and from this intermediate screen, the material will fall upon the rollers 8 and be acted on by the still finer teeth of such rollers. Then the material will pass through the lower screen and fall upon the inclined chute 26 which forms the bottom of the housing and this chute leads the material into a tubular chute 27 which delivers the material into the vertically arranged conveyor housing 28, where the material is picked up by the buckets 29 on an endless chain 30 which carry the material to the top of the housing and delivers it into the chute 31. This chute 31 has a branch 32 leading to a stationary drum 33 and a branch 34 leading to a stationary drum 35, a valve 36 controlling the flow of material to the two branches. The drums are superimposed in a part of the frame and are each heated by a coil 37 surrounding the drum and suitably insulated. Each drum tapers from its outer end to its inner end, as shown in Figure 1 and has a discharge door 38 at the lower part of its outer end. A shaft 39 passes horizontally through each drum and is provided with the paddles 40 so that when the shafts are rotated, the material will be agitated in the drums so that the material is thoroughly dried before being discharged through the door.

The conveyor 30 is connected to the shaft 13 by the chain and sprockets shown generally at 41, and a shaft 42 is connected to the shaft 13 by the chain and sprockets shown generally at 43. This shaft 42 is connected by the sprockets and chains shown generally at 44, with the shaft 39 of the upper heating drum and the shafts 39 are connected together by the chain and sprockets shown generally at 45.

A thermometer 46 is associated with each heating drum and heating coils 47 are arranged under the screens 12 for imparting heat to the material passing through the screens and these coils 47 and the coils 37 are connected with a suitable source of supply in which is located a thermos heat control switch.

From the foregoing it will be seen that the entire apparatus is operated from a single motor and that the material is reduced to a powder by the grinding means and then the powder is delivered to the heating drums where it is thoroughly dried. Thus fish powder is produced.

By providing the jackets for the rollers, these can be removed and substituted by new ones when the old ones become worn or damaged.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:—

1. An apparatus of the class described comprising a housing, a plurality of pairs of grinding rollers in the housing placed one above the other, a screen below each set of rollers, a reciprocatory grinding plate having a portion arranged between the members of the first set of rollers, heating coils associated with each screen and motor driven means for reciprocating the plate and rotating the rollers.

2. An apparatus of the class described comprising a housing, a plurality of pairs of grinding rollers in the housing placed one above the other, a screen below each set of rollers, a reciprocatory grinding plate having a portion arranged between the members of the first set of rollers, heating coils associated with each screen, motor driven means for reciprocating the plate and rotating the rollers, a heating drum, means for conveying the powdered material from the grinding means to the drum, a powder carrying shaft in the drum and means for rotating the same from the motor.

In testimony whereof I affix my signature.

FRED Y. OMUREI.